United States Patent
Varughese

(10) Patent No.: US 10,608,447 B2
(45) Date of Patent: Mar. 31, 2020

(54) SYSTEM AND METHOD FOR AVOIDING DEPLETED BATTERY IN A PARKED VEHICLE

(71) Applicant: FORD GLOBAL TECHNOLOGIES, LLC, Dearborn, MI (US)

(72) Inventor: Sibu Varughese, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 138 days.

(21) Appl. No.: 16/004,731

(22) Filed: Jun. 11, 2018

(65) Prior Publication Data
US 2019/0379218 A1 Dec. 12, 2019

(51) Int. Cl.
*H02H 7/18* (2006.01)
*H02J 7/00* (2006.01)
*B60R 16/033* (2006.01)

(52) U.S. Cl.
CPC .......... *H02J 7/0029* (2013.01); *B60R 16/033* (2013.01); *H02J 7/0063* (2013.01); *H02J 2007/004* (2013.01); *H02J 2007/0067* (2013.01)

(58) Field of Classification Search
USPC ....................................................... 307/10.7
See application file for complete search history.

(56) References Cited

U.S. PATENT DOCUMENTS

| 5,089,762 | A | 2/1992 | Sloan |
| 5,621,250 | A | 4/1997 | Kim |
| 5,691,619 | A | 11/1997 | Vingsbo |
| 7,821,227 | B2 | 10/2010 | Howell et al. |
| 9,156,356 | B2 | 10/2015 | Rini et al. |
| 9,283,906 | B2 | 3/2016 | Kaltenbrunner |
| 9,393,920 | B2 | 7/2016 | Hosey et al. |
| 9,884,557 | B2 | 2/2018 | Park |
| 10,033,213 | B2 * | 7/2018 | Dulle ................ H01M 10/4257 |

FOREIGN PATENT DOCUMENTS

KR 20000072422 A 12/2000

* cited by examiner

*Primary Examiner* — Carlos Amaya
*Assistant Examiner* — Dru Parries
(74) *Attorney, Agent, or Firm* — Frank L. Lollo

(57) ABSTRACT

A vehicle electrical system has a battery monitor configured to measure battery current flowing from a vehicle battery and a power management controller receiving a measured battery current value from the battery monitor. A plurality of controller modules receives the current flowing from the vehicle battery, each controller module being coupled to the power management controller to exchange communication signals. The power management controller detects a key-off state wherein the plurality of controller modules are each configured to invoke a respective reduced-power mode. When the battery load exceeds a sleep threshold during the key-off state then the power management controller resets at least one of the modules to re-invoke the respective reduced-power mode. The resetting can involve cycling a status of an ignition signal from ON to OFF.

19 Claims, 4 Drawing Sheets

SYSTEM AND METHOD FOR AVOIDING DEPLETED BATTERY IN A PARKED VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to battery power management in an automotive vehicle, and, more specifically, to avoiding depletion of a vehicle battery when a vehicle is parked that would result from an electronic module failing to properly enter a sleep state.

A typical automotive electrical system relies on a storage battery for starting an internal combustion engine (and/or closing the high voltage contactors for a hybrid vehicle) and for powering electrical accessories when the engine is not running. Many modern electronic vehicle systems operate continuously even when the vehicle is in a parked, unattended state when the battery is the only available power source. Some electronic modules that must be powered at all times include those that perform functional operations while parked (e.g., antitheft systems and remote entry systems) and those that just need a reduced amount of power to maintain memory contents or monitor/measure various conditions or electrical communication signals (e.g., in a sleep mode). Other modules may continue to operate for a specified time after the driver shuts off the vehicle, but can be powered off after the specified time (e.g., courtesy lighting).

Since a vehicle may remain parked for long periods of time, it is important to limit battery drain so that a sufficient battery state-of-charge is still available to activate the vehicle (e.g., start the engine or close the contactor) when the user returns. Therefore, the vehicle manufacturer specifies limits for the current drawn by various modules under each of the conditions which may arise. In particular, quiescent current limits are set for the modules which apply during times that the vehicle ignition switch has been OFF for a specified time and there has been no user activity. The sum of all the quiescent currents is sufficiently low to extend the ability to activate the vehicle for a sufficiently long time. Nevertheless, the potential remains for the battery to become depleted and unable to start the engine/activate the hybrid after some period of time.

In the event of a dead battery which occurs even though the time that the vehicle sat idle was shorter than the usual time that can be handled by a healthy battery, it is common for the battery to be replaced on the assumption that the battery is defective. Furthermore, customer satisfaction is negatively impacted. However, a dead battery may sometimes be caused by software glitches which resulted in a failure to reduce the battery drain down to the quiescent levels. For example, if one or more of electronic modules are awake during times when they should have entered a sleep mode, this could lead to a prematurely dead battery. The software glitches may not represent a permanent failure, and they may be difficult to detect because the software operation may fully recover after the next ignition cycle. Therefore, the battery may be replaced unnecessarily.

It is known to monitor the state-of-charge of the battery during a key-off condition. By measuring the actual battery state and comparing it to a low battery threshold, the prior art has attempted to avoid a dead battery by taking action to disconnect certain electrical loads after the battery capacity drops too low. Major disadvantages of such a system are that it reacts only after the battery capacity has already been negatively impacted and there is a loss of functionality when loads are disconnected.

SUMMARY OF THE INVENTION

The present invention assesses battery drain (e.g., current draw) during times when only a quiescent current level should be present. In one primary embodiment, when the battery monitoring system detects an abnormally high current drain during a key-off state then a body control module (BCM) or other controller "wakes up" the electrical system by simulating a vehicle activation cycle from OFF to RUN and then back to OFF (which can be accomplished by broadcasting an appropriate multiplex message to change Ignition status, turning on a RUN/START bus, activating a relay, or other actions depending on a particular vehicle design). This likely resets any controller modules that failed to properly enter their sleep states, allowing them to recover/return to their normal key off operation states, thereby avoiding a depletion of the battery. In many modern vehicles, the "reset" of the controller modules can occur without any visible activity (e.g., turning on any user interfaces or activating any devices such as headlights or radio) since the modules often incorporate a wake-up mode for performing software updates without any outward manifestations. Thus, the vehicle appears to continue to sleep while the reset happens.

In one aspect of the invention, a method is provided for limiting battery drain in a vehicle electrical system. A key-off state is detected wherein a plurality of controller modules are each configured to invoke a respective reduced-power mode. A battery load is monitored during the key-off state. If the battery load exceeds a sleep threshold during the key-off state, then at least one of the modules is reset to re-invoke the respective reduced-power mode. Resetting can involve either a cycling of an ignition status signal or a cycling of power supplied to the module(s).

In another aspect of the invention, a vehicle electrical system comprises a battery monitor configured to measure battery current flowing from a vehicle battery, and a power management controller receiving a measured battery current value from the battery monitor. A plurality of controller modules receives the current flowing from the vehicle battery, each controller module being coupled to the power management controller to exchange communication signals. The power management controller detects a key-off state wherein the plurality of controller modules are each configured to invoke a respective reduced-power mode. When the battery load exceeds a sleep threshold during the key-off state then the power management controller resets at least one of the modules to re-invoke the respective reduced-power mode.

DETAILED DESCRIPTION OF PREFERRED EMBODIMENTS

Figure 1:
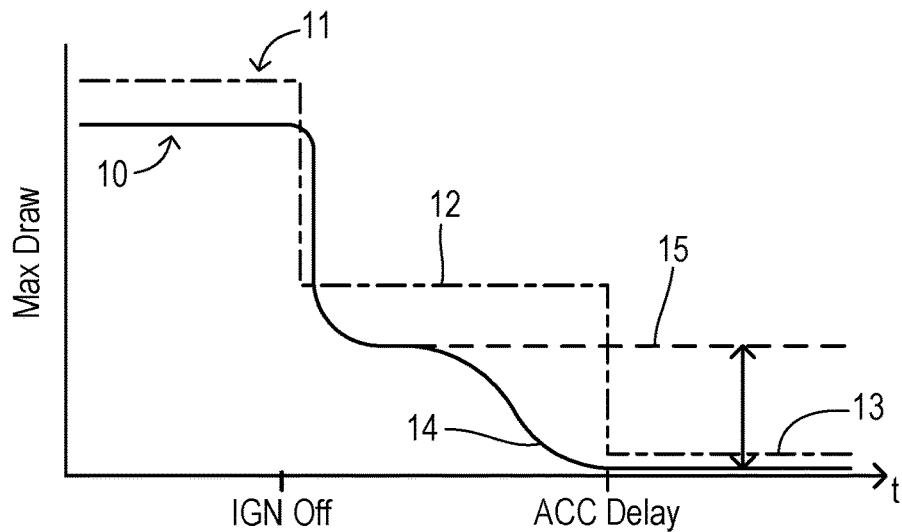
FIG. 1 is a graph showing current draw limits for various vehicle states.
Figure 2:
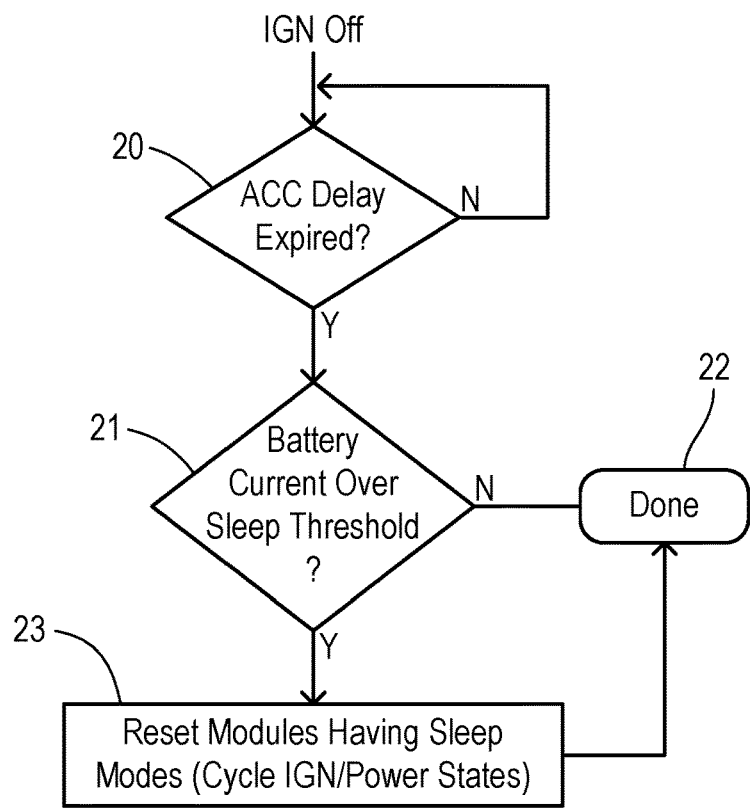
FIG. 2 is a flowchart showing a first embodiment of the invention.

FIG. 1 shows variation of the current drawn from a storage battery to the combined electrical loads over a span of time during which electrical power is not being generated via an internal combustion engine and alternator (i.e., the engine is off). A trace 10 depicts the total current draw, and a dashed line 11 depicts a maximum current draw that is specified for different conditions. While the vehicle is still occupied and the status of the vehicle ignition switch may be set to RUN (i.e., all or nearly all electronic systems and controller modules are fully powered) or ACC (i.e., an Accessory Mode for powering selected systems and modules), trace 10 indicates a relatively higher value of current being drawn. At a time when the state of the ignition switch is set to off (i.e., IGN OFF) and the occupants are exiting the vehicle, many functions are disabled and the expected current draw drops below a level indicated at 12 as some of the systems/modules are powered down. As used herein, "powered down state" includes both 1) a sleep state when a module suspends most activities but still uses a small amount of power to monitor for a wake-up signal, and 2) a fully off condition.

A time period known as an Accessory Delay is typically executed following the IGN OFF during which several systems and modules continue to operate in order to temporarily assist the occupants (e.g., courtesy lighting, active powerpoints, and powered window operation). During the Accessory Delay, active systems may continue to draw current from the battery to operate various devices according to time periods and capabilities determined within the individual systems. At a subsequent time, a power management controller determines that a global Accessory Delay period has expired. After that time, the aggregate battery drain is expected to be below a current limit 13. A branch 14 of trace 10 shows a drop in current draw that occurs when all of the impacted controller modules have achieved their respective reduced-power modes (i.e., sleep or fully off). In the event that one or more controller modules have failed to enter their reduced-power modes, then an excessive current draw remains as shown at 15. The added current draw can result in premature depletion of the battery state-of-charge. The failure of a controller module to enter a reduced-power mode can result from a glitch in the execution of software in the controller module or in the communication of signals between the controller module and a central power management module which coordinates a process for powering down the controller module.

FIG. 1 shows one embodiment of a method for avoiding battery depletion that could result from a temporary glitch that prevents a controller module from entering a reduced-power mode. After the ignition is turned off, the method monitors for an expiration of the Accessory Delay in step 20. The Accessory Delay can be determined according to a measured time period following a predetermined event (e.g., turning off of the ignition switch or closing of a vehicle door) or based on the occurrence of a predetermined set of conditions. Once the Accessory Delay has expired, then a check is performed in step 21 to determine whether the battery current is over a predetermined sleep threshold. The sleep threshold represents a value slightly above the expected battery drain occurring when all the modules configured to have a reduced-power mode have properly entered that mode. If the battery current is not over the sleep threshold, then the method is completed at step 22 since no action is necessary. If the battery current is over the sleep threshold, then the modules having reduced-power modes (e.g., sleep modes) are reset in step 23. The reset operation can include cycling of the ignition status signal (OFF→ON→OFF) or may include actual removal and restoration of the power to a particular module (e.g., when the module obtains power via a controllable relay).

The resetting operation may preferably be handled by a power management controller which is powered at all times (PAAT). A typical module for performing power management functions is a body control module (BCM). A BCM communicates with other modules (referred to herein as controller modules) via a vehicle communication bus (e.g., a multiplex bus such as a CAN bus, a LIN bus, MOST, or Ethernet). The BCM may control various electrical systems of the vehicle by issuing commands to the controller modules and by activating/deactivating power supply relays (load drivers) which can be standalone components, contained in the BCM, or contained in a controlled module.

Figure 3:
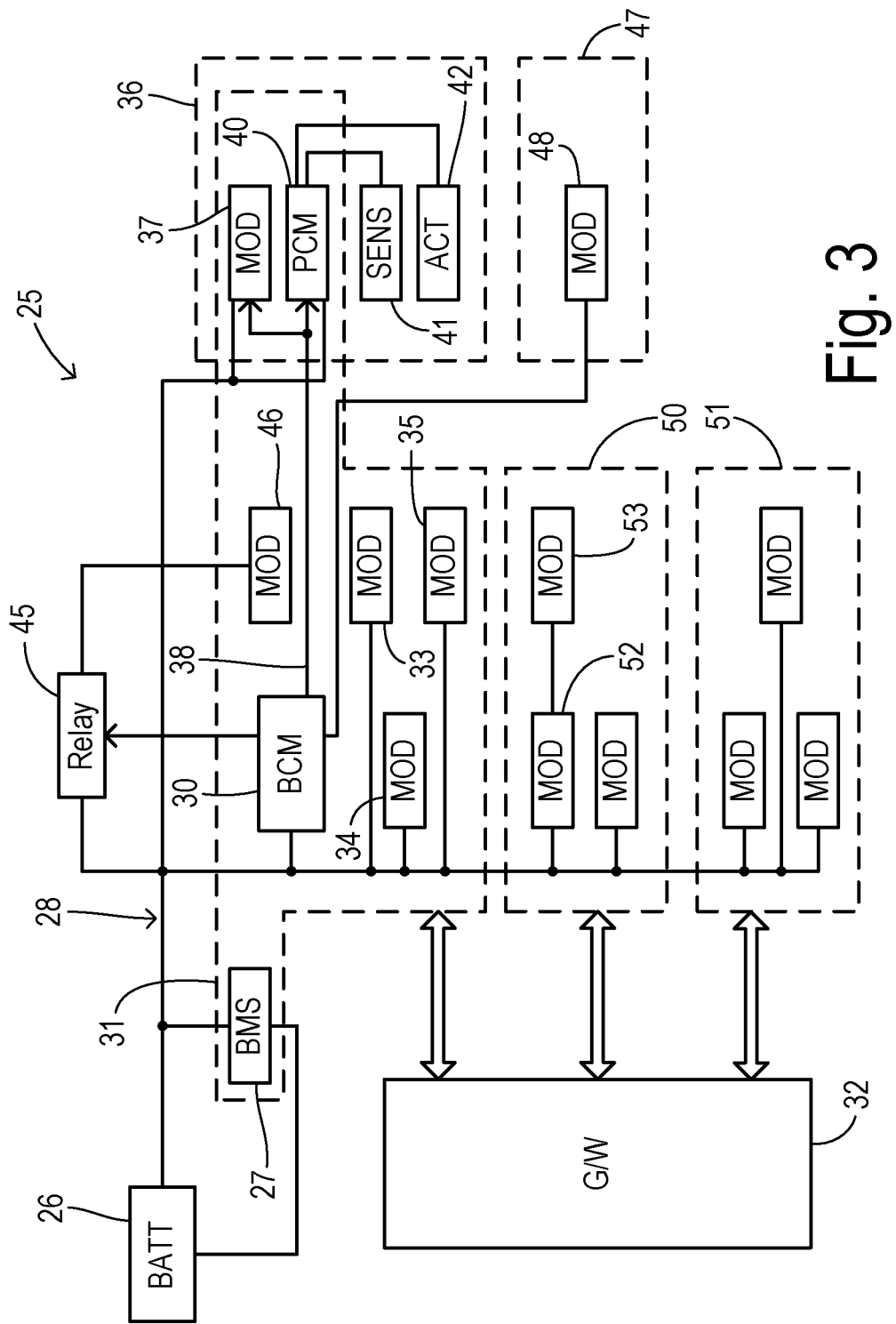
FIG. 3 is a block diagram showing one embodiment of an electrical architecture for distributing electrical power and multiplex communication signals.

FIG. 3 shows an example architecture for an electrical system 25 having a storage battery 26 connected to a battery monitoring system (BMS) 27. BMS 27 may be a conventional component which, among other things, measures battery current flow passing from battery 26 to the electrical loads. A body control module (BCM) 30 and BMS 27 are both contained within and communicate over a bus network 31, such as a CAN bus. Bus network 31 interconnects with a gateway 32 which further connects with additional bus networks 50 and 51 which may operate using different protocols. Gateway 32 re-formats and passes messages between networks so that modules in different bus networks can exchange communication signals as known in the art. A power bus 28 distributes an output of battery 26 to various modules including BCM 30 and many other modules, including a set of modules 33-35 which are interconnected by bus network 31 (i.e., in the bus network as BCM 30).

Also interconnected within bus network 31 are a module 37 and a powertrain control module (PCM) 40. Modules 37 and 40 are controlled by BCM 30 as a sub-net 36 (i.e., have their power managed by BCM 30 as one unit). As used herein, a sub-net is a group of controller modules which share a power management status as controlled by BCM 30. Both modules 37 and 40 receive a supply voltage directly via power bus 28, but each receives shared control signals 38 from BCM 30 in order to activate or deactivate power to modules 37 and 40 simultaneously. Although shown as a separate connection, control signals 38 would typically be comprised of multiplex messages sent via bus network 31. Control messages from BCM 30 may further include commands which control power delivery to subordinate components of a control module, such as sensors 41 and actuators 42 which receive power through PCM 40.

In another example of power management, PCM 30 is connected to a relay 45 which receives power from power bus 28 and selectably transmits power to a module 46. Relay 45 can, for example, be comprised of an ignition relay. Module 46 is further connected with bus network 31. Relay 45 may be controlled by a direct signal connection with BCM 30 or alternatively via a multiplex message. However, rather than having a sleep mode, module 46 is either fully powered or fully depowered according to the ON/OFF state of relay 45. On the other hand, modules 37 and 40 in sub-net 36 are powered at all times from power bus 28, but each invokes a respective reduced-power mode such as a sleep state. Electrical system 25 may include additional sub-nets such as a sub-net 47 having a module 48 which in this case receives power through BCM 30. Accordingly, BCM 30 includes an internal relay for selectively coupling power to sub-net 47.

Bus networks 50 and 51 may likewise include various controller modules receiving power directly from power bus 28 as shown. In addition, there may be modules such as a module 53 which receives power only through another module (e.g., module 52). It is possible that BCM 30 could control a reduced-power mode of module 53 either directly via command signals sent through gateway 32 or via commands delivered to module 52 for controlling whether or not power is passed through module 52 to module 53. Depending upon the manner in which any particular module receives its power and upon the relationship between that module and PCM 30, the invention uses one or more of several available mechanisms for resetting each particular controller module.

Figure 4:
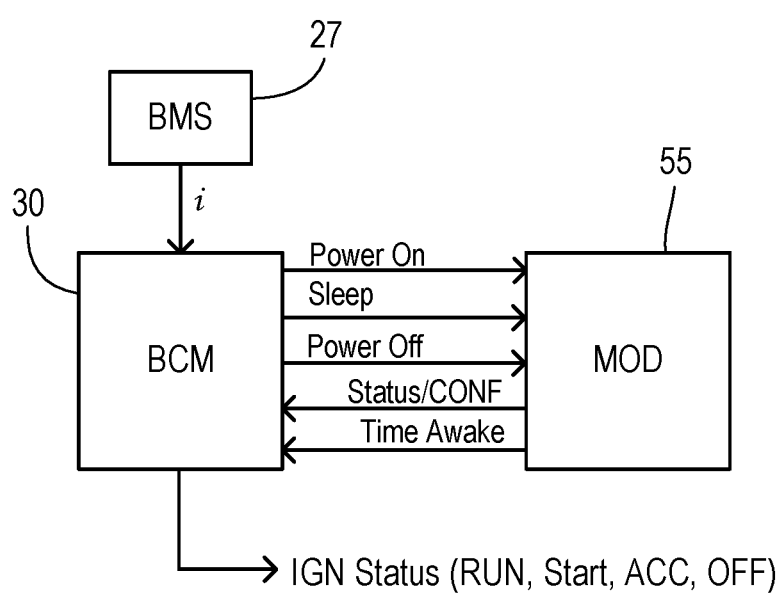
FIG. 4 is a block diagram showing interaction of a power management module and a controller module.

FIG. 4 shows particular interactions conducted by the BCM in performing the invention. Thus, BCM 30 receives a measured current i from BMS 27. BCM 30 exchanges various control and data signals with a representative controller module 55, such as commands from BCM 30 for powering on module 55, commanding a sleep mode in module 55, and initiating a power off mode in module 55. Module 55 may transmit various reply signals to BCM 30 such as a status/confirmation signal, and a data message identifying a duration of time that module 55 has continuously remained awake. The awake time data is used in identifying a module that is causing an excessive current drain as described later. For embodiments of the invention using a cycling of the ignition status, BCM 30 broadcasts a standard multiplex message providing the ignition status to all relevant modules as shown.

Figure 5:
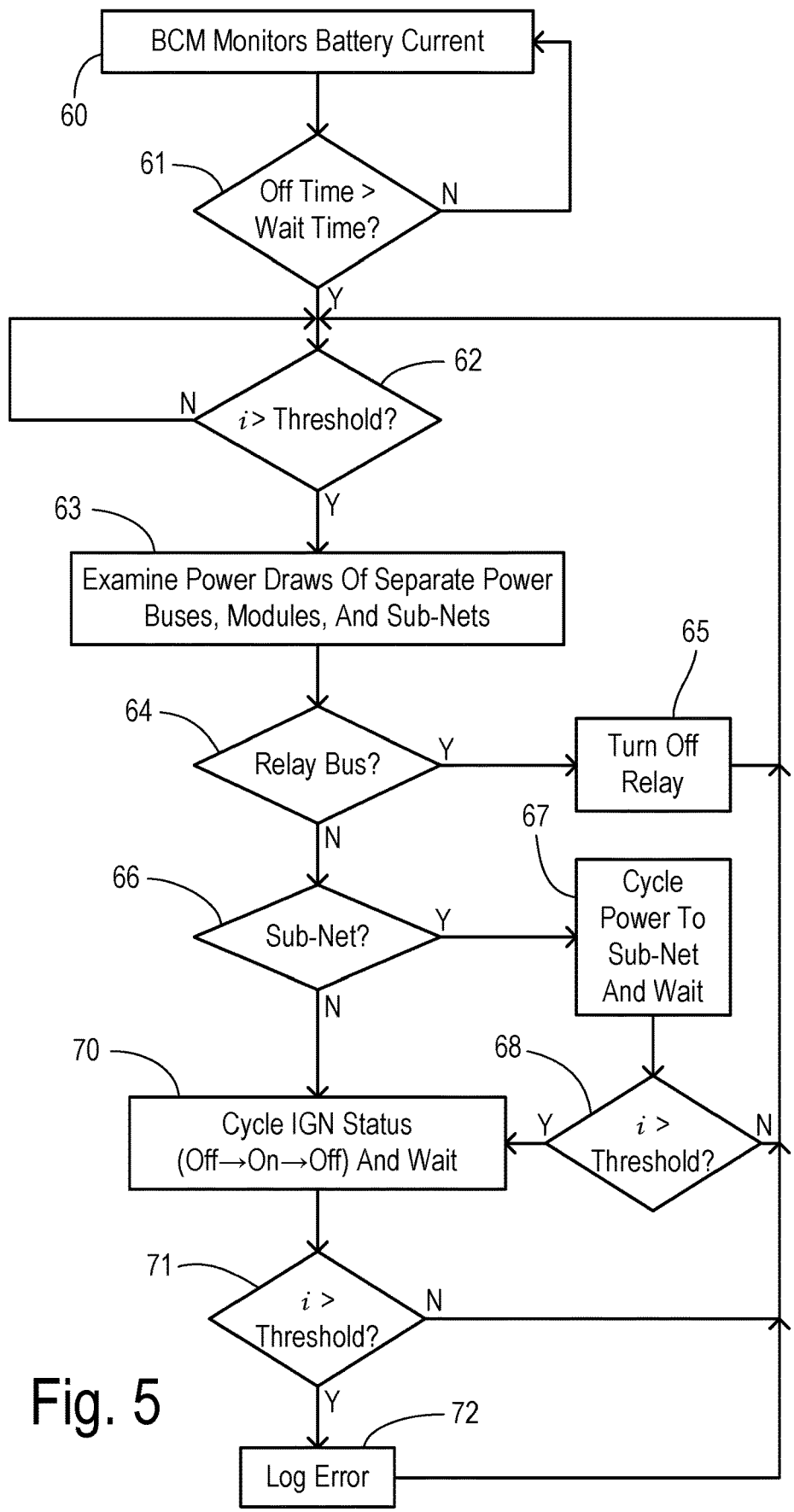
FIG. 5 is a flowchart showing another embodiment of the invention.

FIG. 5 shows a more detailed method of the invention wherein the BCM monitors battery current in step 60. In order to detect a "key-off state" wherein the controller modules are all intended to have already invoked their respective reduced-power modes, the method checks in step 61 to determine whether the elapsed time since the ignition off status was obtained is greater than a predetermined wait time. If not, then battery current continues to be monitored and further checks are performed to detect the key-off state. Once the conditions exist wherein all of the respective controller modules should have achieved their respective reduced-power modes, the method begins to compare battery current to the sleep threshold (e.g., about 50 to 60 mA). If battery current does not exceed the sleep threshold then the method loops back for continuous monitoring against the threshold. If battery current exceeds the sleep threshold, then the separate current flows of individually-identifiable power buses, controller modules, and/or sub-nets are examined (e.g., measured or estimated) in step 63. The identities of power buses, modules, or sub-nets that may be separately examined for their current draws and the methods used to measure/estimate the current draw depend on a particular architecture and components of a particular electrical system. The illustrated embodiment attempts to isolate a bus, module, or sub-net in which the module or modules reside that failed to achieve their reduced-power modes so that the resetting operation can be targeted to the actual faulted module(s). In other embodiments, it is alternatively possible that all modules could be globally reset. However, it may be advantageous to only disturb the module or sub-net containing modules where a fault resides.

Since the hardware necessary to actually measure current draw at the level of each module or sub-net may be cost prohibitive, other means of determining a faulted module or sub-net may be preferred. For example, each module typically maintains a running counter to identify the time that it has been awake. The BCM may collect the awake time data and then compare the awake time for a particular module against the time that has elapsed since the conditions occurred that should have caused that respective module to go to sleep. If the actual awake time exceeds the elapsed time, then the method assumes that the corresponding module has faulted and needs to be reset.

Based on the respective power draws, the method in FIG. 5 takes action to reset the affected or faulted portions of the electrical system. Thus, a check is performed in step 64 to determine whether an excessive current draw corresponds to modules on a particular power bus controlled by a respective power relay. If so, then the corresponding relay is turned off in step 65 and a return is made to step 62 to determine whether the ongoing current draw has now fallen below the sleep threshold. If the area of excessive power draw is not on a relay bus, then a check is performed in step 66 to identify whether the excessive current draw resides on a sub-net. If so, then power is cycled to the sub-net by the BCM in step 67. After cycling power to the sub-net, the method waits for a short delay to allow the resetting of components on the sub-net, and then checks in step 68 to determine whether the current being drawn is still above the sleep threshold. If not (i.e., the presetting of the sub-net was successful), then a return is made to step 62 for ongoing monitoring.

If the faulted module is not in a sub-net as determined in step 66 or the cycling of power to a sub-net was unsuccessful as determined in step 68, then the method proceeds to step 70 for cycling the ignition status. Thus, the BCM broadcasts messages to update the ignition status from OFF to ON, and then after a time sufficient to allow the wake-up of all the affected modules back to OFF. After waiting for a short time to allow settling of the load currents, a check is performed in step 71 to determine whether the total current draw is still above the sleep threshold. If not, then the fault has been corrected and a return is made to step 62 for ongoing monitoring. If current remains over the sleep threshold, then an error may be logged in step 72 to facilitate future servicing, and then return is made to step 62 for ongoing monitoring.

In addition to residing in a body control module, the control logic of the present invention for determining when to perform a reset action in response to an excessive current drain can be executed in another on-board controller module or can be handled remotely in an off-board server system. For example, one function that may be powered at all times could be the collection of various vehicle parameters during an extended vehicle sleep mode for wireless transmission (via a modem) to a central server (i.e., in the cloud). A reported parameter can be the Key Off Load values, which would be evaluated in the cloud and when a problematic load value is detected then a command could be returned over the cloud to the vehicle to initiate the reset as described herein.

What is claimed is:

1. A method of limiting battery drain in a vehicle electrical system having a battery monitor configured to measure battery current flowing from a vehicle battery, a power management controller receiving a measured battery current value from the battery monitor, and an ignition switch for manually determining an ignition status signal, the method comprising the steps of:

detecting a key-off state wherein a plurality of controller modules are each configured to invoke a respective reduced-power mode, wherein the plurality of controller modules receive the current flowing from the vehicle battery and are coupled to the power management controller to exchange communication signals;

monitoring the measured battery current value during the key-off state;

if the measured battery current value exceeds a sleep threshold then resetting at least one of the controller modules to re-invoke the respective reduced-power mode, wherein the resetting by the power management controller is comprised of automatically cycling the ignition status signal from an ON status to an OFF status.

2. The method of claim 1 wherein the plurality of controller modules includes at least one module receiving power through a relay, and wherein the resetting step is comprised of turning off the relay.

3. The method of claim 1 wherein one of the controller modules is a sub-net module within a sub-net for which power is controlled by another module, and wherein the resetting step is comprised of cycling power to the sub-net.

4. The method of claim 1 wherein all of the plurality of modules are reset in the resetting step.

5. The method of claim 1 further comprising the step of:
identifying a faulted module within the plurality of controller modules that has failed to invoke its reduced-power state;
wherein the faulted module is targeted by the resetting step.

6. The method of claim 5 wherein the identifying step is comprised of:
comparing respective awake-time values measured by respective controller modules to an elapsed time since a user manually set the ignition status signal to an OFF status.

7. The method of claim 1 wherein the key-off state is detected by comparing an elapsed time since a user manually set the ignition status signal to an OFF status with a predetermined delay.

8. The method of claim 1 wherein at least some of the respective reduced-power modes are comprised of a respective sleep mode in which a respective controller module suspends its control functions.

9. The method of claim 8 wherein the sleep threshold is greater than a combined battery current of the controller modules having a respective sleep mode.

10. The method of claim 1 wherein at least some of the respective reduced-power modes are comprised of a zero battery load.

11. A vehicle electrical system comprising:
a battery monitor configured to measure battery current flowing from a vehicle battery;
a power management controller receiving a measured battery current value from the battery monitor;
an ignition switch for manually determining an ignition status signal; and
a plurality of controller modules receiving the current flowing from the vehicle battery and coupled to the power management controller to exchange communication signals;
wherein the power management controller detects a key-off state wherein the plurality of controller modules are each configured to invoke a respective reduced-power mode; and
wherein when the battery current exceeds a sleep threshold during the key-off state then the power management controller resets at least one of the modules to re-invoke the respective reduced-power mode; and
wherein the resetting by the power management controller is comprised of automatically cycling the ignition status signal from an ON status to an OFF status.

12. The system of claim 11 wherein the plurality of controller modules includes at least one module receiving power through a relay, and wherein the resetting by the power management controller is comprised of turning off the relay.

13. The system of claim 11 wherein all of the plurality of modules are reset in response to the battery current exceeding the sleep threshold.

14. The system of claim 11 wherein the power management controller identifies a faulted module within the plurality of controller modules that has failed to invoke its reduced-power state, and wherein the faulted module is reset by the power management controller.

15. The system of claim 11 wherein the power management controller identifies the faulted module by comparing respective awake-time values measured by respective controller modules to an elapsed time since a user manually set the ignition status signal to an OFF status.

16. The system of claim 11 wherein the key-off state is detected by comparing an elapsed time since a user manually set the ignition status signal to an OFF status with a predetermined delay.

17. A vehicle electrical system comprising:
a battery monitor configured to measure battery current flowing from a vehicle battery;
a power management controller receiving a measured battery current value from the battery monitor; and
a plurality of controller modules receiving the current flowing from the vehicle battery and coupled to the power management controller to exchange communication signals,
wherein one of the controller modules is a sub-net module within a sub-net for which power is controlled by another module;
wherein the power management controller detects a key-off state wherein the plurality of controller modules are each configured to invoke a respective reduced-power mode;
wherein when the battery current exceeds a sleep threshold during the key-off state then the power management controller resets at least one of the modules to re-invoke the respective reduced-power mode; and
wherein the resetting by the power management controller is comprised of cycling power to the sub-net.

18. The system of claim 17 wherein the plurality of controller modules includes at least one module receiving power through a relay, and wherein the resetting by the power management controller is comprised of turning off the relay.

19. The system of claim 17 wherein the power management controller identifies a faulted module within the plurality of controller modules that has failed to invoke its reduced-power state, and wherein the faulted module is reset by the power management controller.

* * * * *